United States Patent [19]
Funabashi et al.

[11] Patent Number: 5,617,495
[45] Date of Patent: Apr. 1, 1997

[54] OPTICAL SEMICONDUCTOR DEVICE AND CONNECTION STRUCTURE THEREFOR

[75] Inventors: Masaaki Funabashi; Kazuhiko Kurata, both of Tokyo, Japan

[73] Assignee: NEC Corporation, Tokyo, Japan

[21] Appl. No.: 434,908

[22] Filed: May 3, 1995

[30]      Foreign Application Priority Data

May 24, 1994  [JP]  Japan .................................. 6-109283

[51] Int. Cl.[6] .................................................. G02B 6/36
[52] U.S. Cl. ................................................ 385/92; 385/83
[58] Field of Search ................... 385/88–94, 60, 385/61, 79, 84, 85, 83

[56]            References Cited

U.S. PATENT DOCUMENTS 5,315,680  5/1994  Musk et al. ................................ 385/92
5,452,390  9/1995  Bechtel et al. ............................ 385/92

*Primary Examiner*—John Ngo
*Attorney, Agent, or Firm*—Young & Thompson

[57]             ABSTRACT

Semiconductor device can be connected to an external optical fiber, by providing a short optical fiber, optically coupled to a semiconductor, which is held in a ferrule having the same diameter as an external ferrule of the external fiber. The semiconductor device comprises an optical semiconductor laser diode, a short optical fiber optically coupling at its first end face with the optical semiconductor laser diode, a ferrule for housing the optical fiber, and a sleeve which has an inner diameter slightly larger than an outer diameter of the ferrule and into which the ferrule is inserted. The connection to an external optical fiber is given by inserting a connector of the external optical fiber into the sleeve. The present invention provides compact optical semiconductor device suitable for automatic mounting thereof.

5 Claims, 2 Drawing Sheets

OPTICAL SEMICONDUCTOR DEVICE AND CONNECTION STRUCTURE THEREFOR

BACKGROUND OF THE INVENTION

1. Field of the Invention

The present invention relates to optical semiconductor devices and, more particularly, to the coupling structure between the optical semiconductor laser diode and optical fiber of an optical semiconductor device and to the connection structure between the optical fiber and an external optical fiber.

2. Description of Related Art

The structure of conventional optical semiconductor equipment used in optical communications can be classified into two types, a pigtail type and a receptacle type. In the former type, a main body of the equipment has a pigtail cord and the equipment is connected to an external optical fiber by a connector. In the latter type, an external optical fiber is connected directly to an adapter of a main body of the equipment.

On the other hand, there are mainly two types of structures for optically coupling to an optical fiber the light emitted from an optical semiconductor laser diode. One type is a lens coupling structure in which a focusing lens is disposed between the end face of an optical semiconductor laser diode and an optical filler and they are coupled by the lens. Another type is a direct coupling structure for an optical fiber in which the optical fiber end face is disposed in the vicinity of the light-emitting end face of an optical semiconductor laser diode so that the emitted light is coupled directly to the core of the optical fiber.

Among conventional optical semiconductor equipment, the pigtail type has the problem that, when the optical semiconductor equipment is mounted on a printed board, the pigtail cord makes it difficult to handle the optical semiconductor equipment and to mount it automatically on the board. The pigtail cord also has the further problem that a mounting technique such as reflow soldering cannot be used and productivity cannot be increased from the standpoint of component mounting because the cover of the optical fiber does not have high heat-resistance.

On the other hand, the receptacle type does not have the above-described problems but, because an external optical fiber connected to the optical semiconductor equipment is difficult to position in the vicinity of the optical semiconductor laser diode because of its structure, the optical fiber direct coupling structure cannot be employed and only the lens coupling structure can be employed. Therefore, there is the problem that the optically coupled section cannot be reduced in size and a fastening mechanism becomes large and the device as a whole cannot be reduced in size. Further, there is the problem that it is difficult to fix the core position of an optical fiber housed in a ferrule of an optical fiber that is connected, according to the focusing position of the lens, and suitable optical coupling cannot be maintained.

SUMMARY OF THE INVENTION

Accordingly, a principal object of the present invention is to provide an optical semiconductor device which is reduced in size so that direct coupling of an optical fiber can be achieved more readily. Another object of the present invention is to enable simple mounting and accurate connection of an external optical fiber, and also provide an improved connection structure for the optical semiconductor equipment.

Optical semiconductor equipment of the present invention comprises an optical semiconductor laser diode, a short optical fiber optically coupled at its first end face to the optical semiconductor laser diode, a first ferrule for housing the optical fiber, and a sleeve which has an inner diameter slightly larger than the outer diameter of the first ferrule and into which the first ferrule is inserted.

Particularly, the first ferrule houses only a portion of the short optical fiber near a second end face opposite the first end face. Also, the second end face of the optical fiber, together with the end face of the first ferrule, is preferably end-face-ground.

In addition, the end-face grinding may be convex-surface grinding. Further, at the first end face of the optical fiber, the core of the short optical fiber projects in the form of a convex shape. The convex shape of the optical fiber makes it possible to connect with lower connection loss by means of physical contact with each other.

Also, an optical semiconductor device of the present invention comprises a plurality of optical semiconductor laser diodes arranged at predetermined intervals, a plurality of short optical fibers each optically coupled at one end to the optical semiconductor laser diodes, a plurality of bores for housing the short optical fibers, and a guide ferrule having at least two reference pin bores at positions set on the basis of at least one of the plurality of bores.

As for the connection to an optical semiconductor device having a single optical semiconductor laser diode, there is provided a connection structure as described in the following.

The optical semiconductor equipment includes an optical semiconductor laser diode, a short optical fiber optically coupled at its first end ferrule for housing the optical fiber and a sleeve which has an inner diameter slightly larger than the outer diameter of the first ferrule and into which the first ferrule is inserted. An optical fiber cord includes a second ferrule having an outer diameter substantially identical to that of the first ferrule, and an optical fiber having a second end face inserted into the second ferrule. The second ferrule of the optical fiber cord is inserted into the sleeve of the optical semiconductor device. The first end face of the short optical fiber of the optical semiconductor device and the second end face of the optical fiber contact each other so that semiconductor device and the optical fiber are connected.

Also, for the connection with an optical semiconductor device having a plurality of optical semiconductor elements, there is provided according to the present invention a connection structure as described as follows:

The optical semiconductor device includes a plurality of optical semiconductor laser diodes arranged at predetermined intervals, and a plurality of short optical fibers each optically coupled to the optical semiconductor laser diodes. The device also includes a plurality of bores arranged at predetermined intervals for housing the short optical fibers, and a first guide ferrule having at least two first reference pin bores at positions set on the basis of at least one of the plurality bores.

An optical fiber cord array includes reference pins having an outer diameter slightly smaller than an inner diameter of the first reference pin bores, and a plurality of bores provided at the same intervals as the intervals of the bores in which the short optical fibers of the first guide ferrule are housed. The array also includes a second guide ferrule having at least two second bores at positions set on the basis of at least one of the plurality of bores, and a plurality of optical fibers each inserted into the plurality of bores of the second ferrules.

The reference pins are inserted into the first reference pin bores of the optical semiconductor device, and also into the second reference pin bores of the optical fiber cord array so that the optical semiconductor device and the optical fiber array are connected.

In the connection of the optical semiconductor device of the present invention, the light emitted from the optical semiconductor laser diode is coupled to the short optical fiber disposed in the optical semiconductor device. The opposite portion of the short optical fiber is then housed in the ferrule, and the ferrule is inserted into the sleeve. The connection with an external optical fiber is performed by inserting the ferrule on the optical fiber into the above-described sleeve of the optical semiconductor device and having the end faces of the ferrule contact each other.

In the case of an optical semiconductor device having a plurality of optical semiconductor laser diodes arranged in the form of an array on the same substrate, a plurality of short optical fibers each optically coupled to the optical semiconductor laser diodes are arranged and housed in the guide ferrule having a plurality of bores into which the ends of the short optical fibers opposite to the optical semiconductor laser diodes are inserted. The optical semiconductor device is connected to an external fiber by inserting the reference pins of the ferrule of the external fiber into the reference pin bores formed in the ferrule of the optical semiconductor device.

In either construction, the light emitted by the optical semiconductor laser diode is coupled directly to the optical fiber. Therefore, these structures make the optical semiconductor device more compact. Also, since the connection to an external optical fiber is performed by having both ferrules contact each other, low loss and stable connection becomes possible.

BRIEF DESCRIPTION OF THE DRAWINGS

The above and other objects, features and advantages of this invention will become more, apparent by reference to the following detailed description of the invention taken in conjunction with the accompanying drawings, wherein.

DETAILED DESCRIPTION OF THE PREFERRED EMBODIMENTS

Before describing the preferred embodiments of the present invention, conventional structures of two types of optical semiconductor devices which are pigtail and receptacle types as mentioned above, will be described to help in understanding the present invention.

Figure 1:
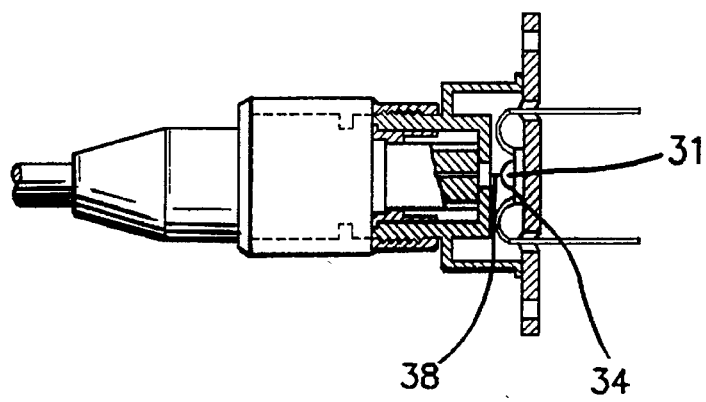
FIG. 1 is a sectional view of conventional pigtail type optical semiconductor equipment.

FIG. 1 is a sectional view of conventional pigtail type optical semiconductor equipment. As shown in FIG. 1, the conventional pigtail type equipment includes an optical semiconductor laser diode 31, optical fiber 38 and a focusing lens 34 to focus light radiated from the optical semiconductor laser diode 31 to the core of the optical fiber 38. Also, the conventional pigtail type equipment is provided with an optical connector to connect with an external optical fiber (not shown).

Figure 2:
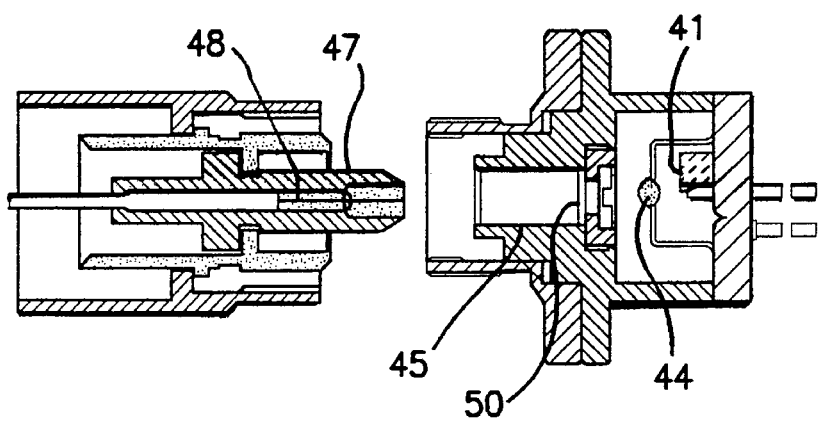
FIG. 2 is a sectional view of conventional receptacle type optical semiconductor equipment.

FIG. 2 shows a sectional view of a conventional receptacle type optical semiconductor equipment and also an external optical fiber connector. As shown in the fight side portion of FIG. 2, the conventional receptacle type equipment includes an optical semiconductor laser diode 41, a sleeve 45 to receive a ferrule 47 of an external fiber 48, a focusing lens 44 and a glass partition 50. The glass partition is located to define a position of the end of the optical fiber 48 in such a way that both optical semiconductor laser diode 41 and the optical fiber 48 can be optically connected at the most suitable position. Therefore, the focusing lens 44 is positioned to focus a radiated light from the optical semiconductor laser diode 41 to the surface of the glass 50.

Among the above-described conventional optical semiconductor equipment, the pigtail type module is not compact and is not suitable for automatic mounting on a printed board because of the optical fiber cord and the connector. On the other hand, the receptacle type module does not have those problems, but it is difficult to adjust a focusing point by alignment of a position of a focusing lens 44 or an optical semiconductor laser diode 41. As a result, high efficiency of optical coupling between the optical semiconductor diode 41 and the optical fiber 48 cannot be provided by the receptacle type module. Further, the receptacle type equipment requires a focusing lens 44 due to the distance between the optical semiconductor laser diode 41 and the end face of the external optical fiber 48.

Figure 3:
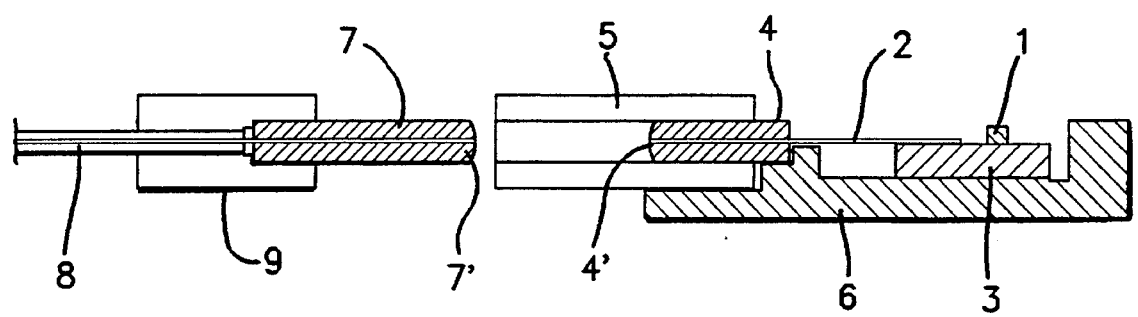
FIG. 3 is a longitudinal sectional view of an embodiment of optical semiconductor equipment of the present invention.
Figure 4:
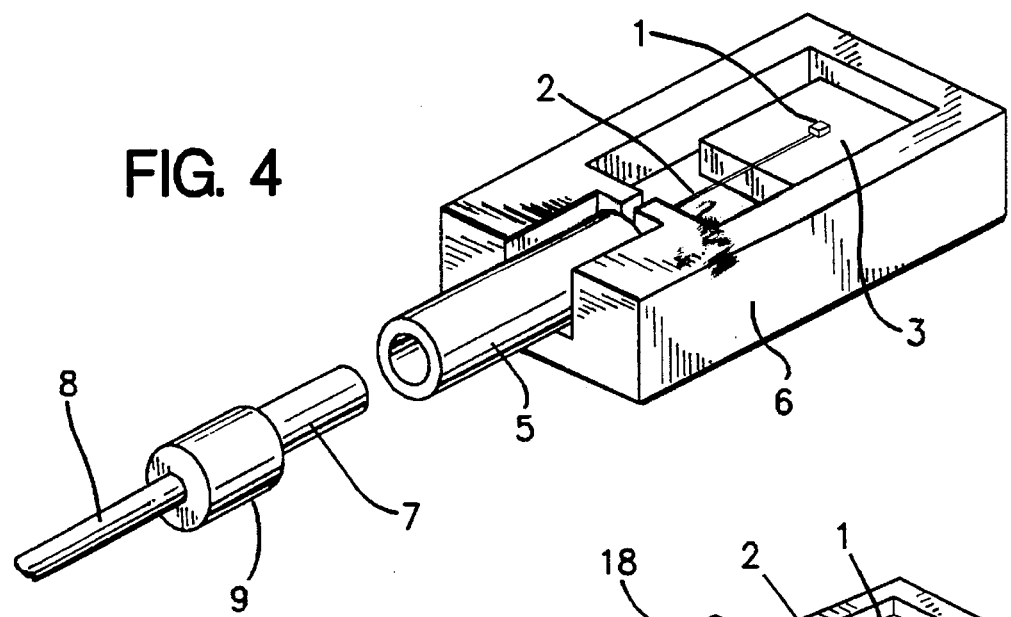
FIG. 4 is a perspective view showing the overall structure of the embodiment of FIG. 3.

The present invention which can solve these problems will hereinafter be described in detail with reference to the drawings. FIG. 3 is a longitudinal sectional view of an embodiment of an optical semiconductor device of the present invention, and FIG. 4 is a perspective view of the optical semiconductor device of FIG. 3.

A semiconductor laser diode 1 is bonded to a silicon substrate 3 by An-Sn soldering. A short optical fiber 2 has one end face optically connected to the semiconductor laser diode 1 and an opposite end face housed in a ferrule 4 with a diameter of 2 mm and permanently adhered to the ferrule 4 by ultraviolet-hardened resin. Also, the core of the end of the short optical fiber 2 facing the semiconductor laser diode 1 is treated to have an uneven surface by chemical etching using fluoric acid. The short optical fiber 2 is then disposed in a V-shaped groove (not shown) formed by chemical etching in the silicon substrate 3. The core is then fixed to the substrate 3 by soldering and optically coupled to the semiconductor laser diode 1. The ferrule 4 is inserted into and fixed to a sleeve 5 which has a slightly larger inner diameter and which is mounted in a module package 6.

In this embodiment, a borosilicate glass is used in the ferrule 4 which is high in light transmittance, so it is suitable for the adhesion of the short optical fiber 2 by ultraviolet-hardened resin. The borosilicate glass can be produced by drawing out the basic material in the same way as the manufacturing method of optical fibers, so it is easy to produce with a high degree of accuracy and it can be mass produced. Other materials such as ceramic may be used instead of borosilicate glass.

The distal end 4' of the ferrule 4 and the short optical fiber 2 are spherically surface-ground by spherically polishing. The distal end 7' of a ferrule 7 and an external optical fiber 8 are also spherically surface-ground. The short optical fiber 2 can be connected to an external physical-contact (PC) ground optical fiber, to reduce connection loss.

The ferrule 7 has the same outer diameter as the ferrule 4 and is installed in the distal end of an optical fiber 8. The connection of the optical semiconductor equipment of this embodiment to an external optical fiber, as shown in FIG. 3, is performed by inserting the ferrule 7 of the external optical fiber into the sleeve 5 of the semiconductor device. Since the connection to the external optical fiber can easily be performed after the optical semiconductor device has been mounted on a printed board and the like, automatic mounting of the optical semiconductor device can be performed. Also, low loss and stable connection of the optical semiconductor device to the optical fiber is provided because it can be performed in the same way as a connection by a connector.

Figure 5:
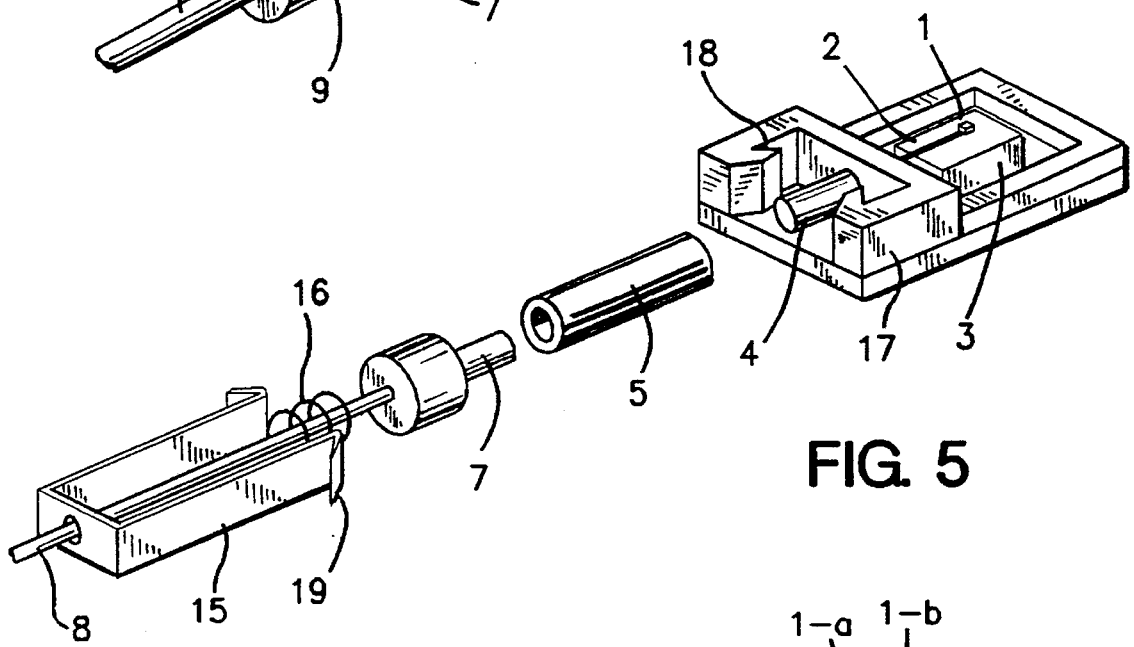
FIG. 5 is a perspective view showing the overall structure of a second embodiment of optical semiconductor equipment of the present invention.

Another embodiment of optical semiconductor device according to the present invention will now be described with reference to FIG. 5. FIG. 5 is a perspective view showing the construction of the second embodiment of the optical semiconductor device of the present invention. This embodiment basically has the same structure as the first embodiment. In addition, this embodiment also has a fastening block 17 with cleat portions 18 located beside the ferrule 4, in order to tightly fasten a ferrule 7 of an external optical fiber 8 to the ferrule 4.

A sleeve 5 is connected to the ferrule 4, and the ferrule 7 is inserted into the sleeve 5. Flange portions 19 of plate spring 15 are then urged into locking engagement with cleat portions 18. After fastening, spring 16 urges the ferrule 7 further into sleeve 5 and a physical contact between the ends of the optical fiber 2 and optical fiber 8 is maintained by the spring pressure.

Figure 6:
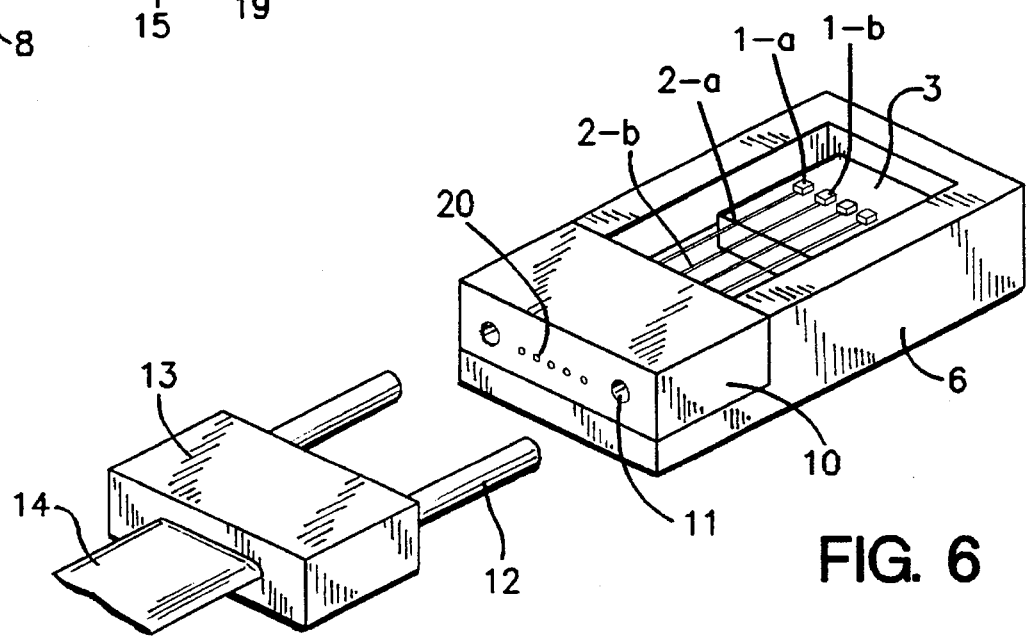
FIG. 6 is a perspective view showing the overall structure of optical semiconductor equipment with a plurality of semiconductor diodes and optical fibers, according to the present invention.

Next, another embodiment of array-type optical semiconductor device of the present invention, which includes a plurality of optical semiconductor laser diodes and optical fibers connected thereto, will be described. FIG. 6 is a perspective view showing this embodiment of the present invention, which has five semiconductor laser diodes 1-*a*, 1-*b*, 1-*c*, 1-*d* and 1-*e* disposed on a common silicon substrate 3. Five short optical connector fibers 2-*a* to 2-*e* are optically connected to the five semiconductor laser diodes 1-*a* to 1-*e*, respectively. Other aspects of this embodiment are the same as for the embodiment of FIG. 3.

The five short optical fibers 2-*a* to 2-*e* are inserted into and adhered to five bores 20 formed in a guide block 10. The bores 20 of block 10 have in this embodiment a diameter of 126 μm, which is slightly larger than the 125 μm outer diameter of the short optical fibers 2, and are spaced 250 μm apart from each other. Guide block 10 is further provided with two opposite reference pin bores 11 having a diameter of 1 mm at positions 500 μm away from the outermost bores 20. This guide block 10 is fixed to package 6.

On the other hand, the optical fiber connector 12-14 comprises an optical fiber array 14 having five optical fibers and, likewise, a guide block 13 with five reference pin bores is attached to the distal end of the optical fiber array 14. The five bores that hold the optical fibers and the opposite reference pin bores (not shown) are the same diameter as the bores 20 and 11 of the guide block 10, respectively and arranged at the same intervals as in the guide block 10. Two reference pins 12 are mounted in reference pin bores of the guide block 13, and the optical fiber array 14 is connected to the optical semiconductor device by inserting the reference pins 12 into the reference pin bores 11 of block 10. Note that the guide block 13 can be mass-produced with a high degree of accuracy by precision resin molding.

As has been described above, in both the case of a single optical semiconductor laser diode and the case of a plurality of optical semiconductor laser diodes arranged in an array, the radiated light from the optical semiconductor laser diodes is coupled directly to an optical fiber according to the present invention. Therefore, the optical semiconductor equipment of the present invention can be more compact than conventional equipment. In addition, the connection of the optical semiconductor equipment to an external optical fiber is performed by having both ferrules or guide blocks contact each other, so a stable connection and prevention of light loss is provided by the present invention. Further, an efficiency of optical coupling in the short optical fiber arranged in the optical semiconductor equipment can be increased by convex-surface-working the end face of the fiber arranged on the side of the optical semiconductor laser diode.

Therefore, it is now possible to construct optical semiconductor devices in which an optical fiber may be connected to an external optical fiber with low light loss and high stability. Therefore, the optical semiconductor devices can be reduced in size and automatically mounted.

While the invention has been described with relation to various preferred embodiments, various modifications and adaptations thereof will be readily apparent to those skilled in the art. All such modifications and adaptation that fall within the scope of the appended claims are intended to be covered thereby.

We claim:

1. Optical semiconductor device, comprising:

an optical semiconductor element;

a short optical fiber directly optically coupled at a first end face to said optical semiconductor element, said optical semiconductor element and one end of said short optical fiber being mounted on a common silicon substrate, said common silicon substrate comprising a V-groove on one surface thereof, said one end of said short optical fiber being disposed in said V-groove;

a first ferrule receiving said optical fiber, said first ferrule receiving only a portion of said short optical fiber near a second end face opposite said first face, said second end face of said optical fiber, together with an adjacent end face of said first ferrule, being end-face-ground; and a sleeve having an inner diameter larger than an outer diameter of said first ferrule, into a first end of which said first ferrule is inserted and being sufficiently long to receive in a second end thereof a second ferrule including an external optical fiber.

2. The optical semiconductor device claimed in claim 1, wherein said end-face grinding is convex-surface grinding.

3. The optical semiconductor device claimed in claim 1, wherein at least one of said first and second ferrules is formed of a borosilicate glass.

4. The optical semiconductor device claimed in claim 1, wherein, at said first end face, a core of said short optical fiber projects in a form of a convex shape.

5. Optical semiconductor device comprising:

a plurality of optical semiconductor elements arranged at predetermined intervals;

a plurality of short optical fibers each optically coupled to a respective one of said optical semiconductor elements, said optical semiconductor elements and one end of each of said plurality of short optical fibers being mounted on a common silicon substrate, said common silicon substrate comprising a plurality of V-grooves on one surface thereof, said one end of each of said plurality of short optical fibers being arranged in respective ones of said V-grooves; and a guide block having a plurality of bores each receiving a respective one of said short optical fibers and also having at least two reference pin bores located at predetermined positions relative to at least one of said plurality of bores.

* * * * *